United States Patent
Saenz

[19]

[11] Patent Number: 6,139,123
[45] Date of Patent: Oct. 31, 2000

[54] KITCHEN ORGANIZER

[76] Inventor: John Saenz, 58 Corona Ave., #A, Long Beach, Calif. 90803

[21] Appl. No.: 09/248,918

[22] Filed: Feb. 11, 1999

[51] Int. Cl.⁷ .................................................. A47F 5/08
[52] U.S. Cl. ............................ 312/245; 312/206; D6/469
[58] Field of Search ................................... 312/245, 242, 312/246, 205, 206, 207, 237, 352; D6/469, 553, 573, 574; D19/91; 206/371, 224

[56] References Cited

U.S. PATENT DOCUMENTS

| | | | |
|---|---|---|---|
| D. 284,053 | 6/1986 | Chinchar | D6/469 |
| D. 288,763 | 3/1987 | Berfield et al. | D6/469 X |
| 723,964 | 3/1903 | Wilson | 312/245 X |
| 1,291,349 | 1/1919 | Ackers | 312/207 X |
| 1,713,379 | 5/1929 | Fromwiller | 312/207 X |
| 2,024,692 | 12/1935 | Kirmss | 312/206 X |
| 3,228,737 | 1/1966 | Kipnis | 312/245 X |
| 3,605,160 | 9/1971 | Maurer | 312/206 X |
| 4,776,650 | 10/1988 | Ferenzi | 312/245 |
| 5,833,330 | 11/1998 | Kos | 312/245 X |

*Primary Examiner*—Peter M. Cuomo
*Assistant Examiner*—James O. Hansen
*Attorney, Agent, or Firm*—Robert M. Sperry

[57] ABSTRACT

A storage device having a body formed with releasable fasteners for mounting on a wall or refrigerator and formed with a plurality of compartments, receptacles, recesses and hooks for receiving and storing small items.

7 Claims, 2 Drawing Sheets

KITCHEN ORGANIZER

FIELD OF INVENTION

This invention relates to organizer shelves and is particularly directed to improved organizer shelves for kitchens and the like.

PRIOR ART

It is well known that there is never enough storage space, especially in kitchens, garages and the like. This is particularly true for small items, such as scissors, shopping bags, dusters, spare keys, pencils, pens, markers, paper bags, pot holders, etc. Cabinet drawers rapidly become filled and it is often difficult to locate small items in these drawers. At the same time, cabinet shelves are needed for storing dishes, glasses, flour, sugar and numerous more bulky items. Cleansers, pesticides and the like are often stored beneath the sink, however, it is undesirable to store items which will be used with food in contact with items which are distasteful and possibly toxic. Thus, none of the prior art storage devices has been entirely satisfactory.

BRIEF SUMMARY AND OBJECTS OF INVENTION

These disadvantages of the prior art are overcome with the present invention and an improved storage device is provided which is specifically designed to accommodate and store a plurality of small items conveniently and ready for instant use and which is inexpensive to purchase and simple to install in substantially any desired location.

These advantages of the present invention are preferably attained by providing a storage device having a body formed with releasable attaching means for mounting on a wall or refrigerator and formed with a plurality of compartments, receptacles, recesses and hooks for receiving and storing small items.

Accordingly, it is an object of the present invention to provide an improved storage device.

Another object of the present invention is to provide an improved storage device which is specifically designed to accommodate and store a plurality of small items.

An additional object of the present invention is to provide an improved storage device which is specifically designed to accommodate and store a plurality of small items conveniently and ready for instant use.

A further object of the present invention is to provide an improved storage device which is inexpensive to purchase and simple to install in substantially any desired location.

A specific object of the present invention is to provide a storage device having a body formed with releasable attaching means for mounting on a wall or refrigerator and formed with a plurality of compartments, receptacles, recesses and hooks for receiving and storing small items.

These and other objects and features of the present invention will be apparent from the following detailed description, taken with reference to the figures of the accompanying drawing.

DETAILED DESCRIPTION OF THE INVENTION

Figure 1:
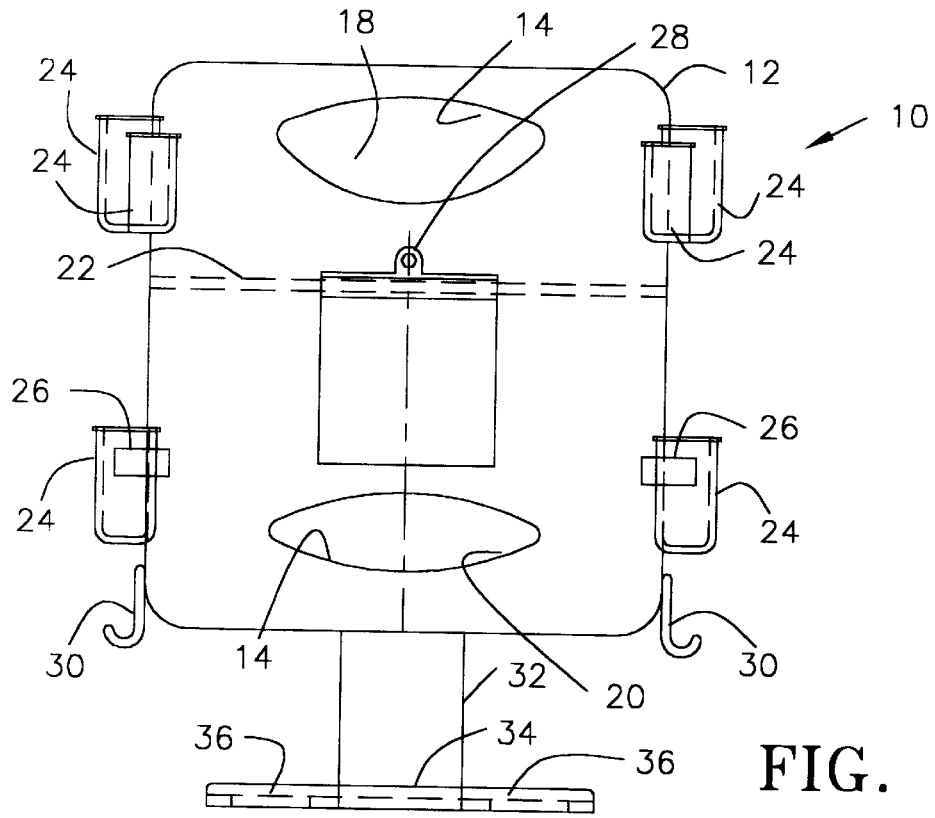
FIG. 1 is a front view of a storage device embodying the present invention.
Figure 2:
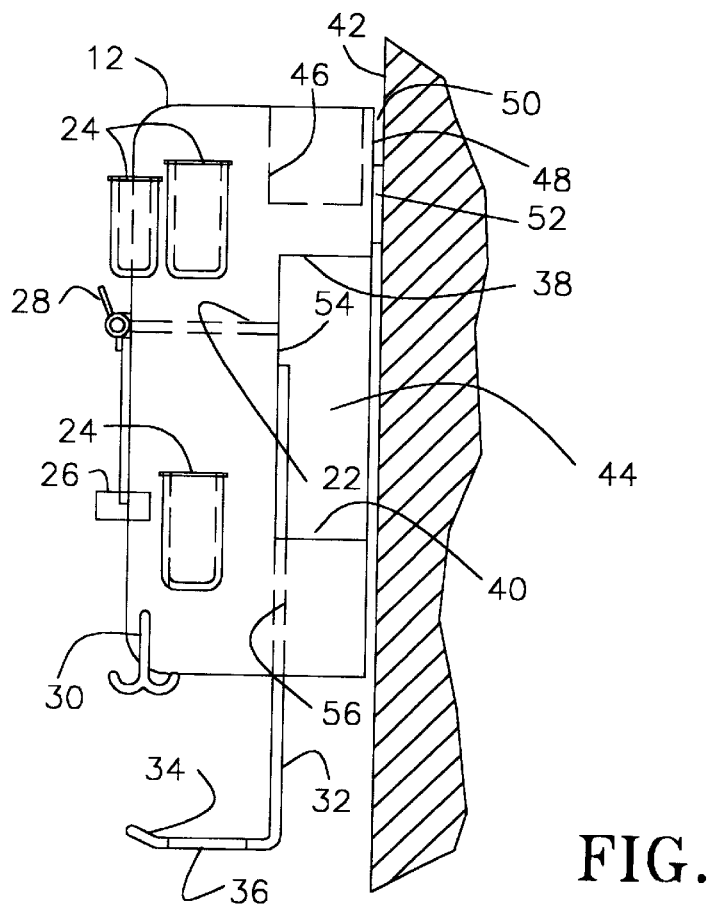
FIG. 2 is a side view of the storage device of FIG. 1.
Figure 3:
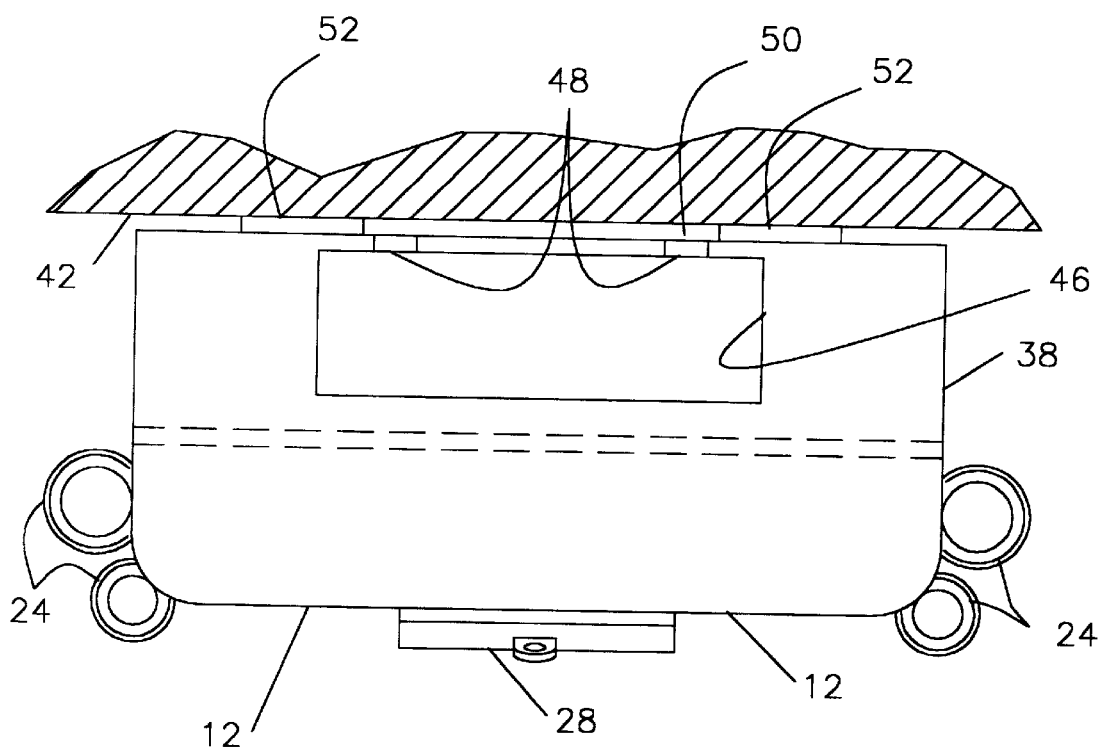
FIG. 3 is a plan view of the storage device of FIG. 1.

In that form of the present invention chosen for purposes of illustration in the drawing, FIG. 1 show a storage device, indicate generally at 10, having a generally box-like, hollow body 12 having openings 14 and 16 communicating with upper and lower chambers 18 and 20 within the body 12 and separated by a suitable interior divider 22. A plurality of cup-like receptacles 24, in a variety of sizes, are mounted on the body 12 and one or more strap members 26 are provided for releasably retaining items, such as pens, markers and the like. A spring clip 28 is mounted on the front of the body 12 and a pair of hook members 30 are mounted adjacent the lower front corners of the body 12. Also, a leg 32 extends downwardly from the body 12 to support a horizontal shelf 34 which is formed with openings 36 located adjacent the respective ends of the shelf 34. As best seen in FIGS. 2 and 3, a pair of leg members 38 and 40 project rearwardly from the body 12 and serve to hold the body 12 away from the surface 42 of a supporting wall, refrigerator or the like and to define a cavity 44 between the body 12, the leg members 38 and 40 and the surface 42 which can serve to store bulky items such as folded paper bags, cookbooks and the like. Upper leg member 38 is formed with a recess 46 which can serve as a receptacle for items such as glue containers, reels of string, scouring pads and the like. Furthermore, a pair of openings 48 are provided extending through the rear wall 50 of recess 46 to permit passage there-through of suitable means, such as screws, nails or the like, for fastening the storage device 10 to a wall or the like. Alternatively, releasable fastening means 52, such as magnets, patches of hook-and-loop material or the like, may be provided on the outside of the rear wall 50 of recess 46 to releasably attach the storage device 10 to a refrigerator or other surface which would be damaged or marred by screws, nails or the like. As best seen in FIG. 2, leg 32 is preferably attached to the rear surface 54 of body 12 and extends through a suitable opening 56 formed in lower leg member 40 to support the shelf 34. If desired leg 32 may be frictionally slideably attached to the body 12 to permit the leg 32 to be retracted for packing and shipping or when not needed for use and to be extended, when desired to the position seen in FIG. 2 for use.

In use, small items, such as glue containers, scrubbers, etc. can be placed in the recess 46 in the upper leg member 38, while thinner items, such as pencils, scissors, etc. can be stored in the receptacles 24. Marker pens and the like, having clips, can be attached to rings 26, while items having loops, such as pot holders, can be suspended from hooks 30. Plastic shopping bags can be stuffed into opening 14 into chamber 18 in the interior of body 12, while other items, such as garbage bags can be stuffed through opening 14 into chamber 20. Handled items, such as spatulas, soup ladles, dusters and the like, can be stored by inserting the handles through openings 36 in shelf 34 and packaged items, such as sandwich bags, can be stored on the shelf 34. Bulky items, such as folded paper bags can be stored in cavity 44. Thus, the storage device 10 provides convenient storage for a plurality of miscellaneous items which would otherwise be scattered about the kitchen.

obviously, numerous variations and modifications can be made without departing from the spirit of the present invention. Therefore, it should be clearly understood that the form of the present invention described above and shown in the figures of the accompanying drawing is illustrative only and is not intended to limit the scope of the present invention.

What is claimed is:

1. A storage device comprising:

a hollow, box shaped body having at least one interior chamber and an opening providing access to said chamber for inserting or removing articles to and from said chamber, means for releasably attaching a memo pad to a front of said body, a plurality of cup shaped receptacles mounted on said body, and a pair of leg members projecting rearwardly from said body adjacent upper and lower edges of said body to space said body from a supporting surface, an additional leg projecting downward from said body and carrying a shelf for storing additional articles, said additonal leg being frictionally slideably attached to said body and moveable between an extended and a retracted position.

2. The device of claim 1 wherein:

said leg members defining a recess between said body and said supporting surface for storage of additional articles.

3. The device of claim 1 wherein:

said receptacles vary in size.

4. The device of claim 1 wherein:

at least one of said leg members is formed with a recess for storing additional articles.

5. The device of claim 1 further comprising:

at least one strap member for releasably retaining articles having pocket clips.

6. The device of claim 1 further comprising:

at least one hook projecting from said body.

7. The device of claim 1 wherein:

said shelf is formed with at least one opening extending therethrough to receive handled articles.

* * * * *